United States Patent
Thakkar et al.

(10) Patent No.: US 11,341,514 B2
(45) Date of Patent: May 24, 2022

(54) DETERMINING USER RETENTION VALUES USING MACHINE LEARNING AND HEURISTIC TECHNIQUES

(71) Applicant: EMC IP Holding Company LLC, Hopkinton, MA (US)

(72) Inventors: Bina K. Thakkar, Cary, NC (US); Chao Su, Cary, NC (US); Roopa A. Luktuke, Morrisville, NC (US); Aditya Krishnan, Cary, NC (US); Deepak Gowda, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 159 days.

(21) Appl. No.: 16/523,309

(22) Filed: Jul. 26, 2019

(65) Prior Publication Data
US 2021/0027316 A1    Jan. 28, 2021

(51) Int. Cl.
*G06Q 30/02* (2012.01)
*G06Q 10/10* (2012.01)
*G06N 20/00* (2019.01)
*G06F 16/335* (2019.01)
(Continued)

(52) U.S. Cl.
CPC ....... *G06Q 30/0201* (2013.01); *G06F 16/337* (2019.01); *G06F 16/3344* (2019.01); *G06K 9/6278* (2013.01); *G06N 20/00* (2019.01); *G06Q 10/1091* (2013.01)

(58) Field of Classification Search
None
See application file for complete search history.

(56) References Cited

U.S. PATENT DOCUMENTS 10,120,790 B1   11/2018  Varteresian et al.
2002/0107853 A1*  8/2002  Hofmann .............. G06F 16/335
2011/0295649 A1  12/2011  Fine et al.
(Continued)

FOREIGN PATENT DOCUMENTS

CN    108717408 A  * 10/2018

OTHER PUBLICATIONS

Shaikh et al. "Trust Model for Measuring Security Strength of Cloud Computing Service." International Conference on Advanced Computing Technologies and Applications (ICACTA-2015). Procedia Computer Science 45 (2015) 380-389.*

*Primary Examiner* — Susanna M. Diaz
(74) *Attorney, Agent, or Firm* — Ryan, Mason & Lewis, LLP

(57) ABSTRACT

Methods, apparatus, and processor-readable storage media for determining user retention values using machine learning and heuristic techniques are provided herein. An example computer-implemented method includes processing multiple forms of input data pertaining to interactions between a user and an enterprise; generating one or more user sentiment values from the processed input data by applying machine learning techniques to the processed input data; determining a user-specific estimate for the enterprise retaining the user, wherein determining the user-specific estimate comprises combining the one or more sentiment values with one or more storage system heuristics-based values derived from enterprise-related data; and outputting the user-specific estimate to at least one entity within the enterprise for use in connection with user-support actions.

20 Claims, 7 Drawing Sheets

(51) Int. Cl.
*G06F 16/33* (2019.01)
*G06K 9/62* (2022.01)

(56) References Cited

U.S. PATENT DOCUMENTS

| | | | |
|---|---|---|---|
| 2017/0060930 A1* | 3/2017 | Elkherj | G06F 16/248 |
| 2018/0032906 A1 | 2/2018 | Gangadharappa | |
| 2018/0052878 A1 | 2/2018 | Seetharaman et al. | |
| 2018/0260860 A1* | 9/2018 | Devanathan | G06F 16/345 |
| 2020/0327449 A1* | 10/2020 | Tiwari | G06N 20/20 |

* cited by examiner

```
upon any user interaction
    get transcript of the interaction
    for each data source (service request, chat, community post, phone calls, emails)

// NLP compatible format
        convert to text

// clean text
        // punctuations: \ , # : ; etc.
        remove punctuation // use custom stop words corpus
        // remove words: a, an, here, if, have, etc.
        // do not remove words: against, but, no, not, etc.
        // some words were not removed as such would provide additional
        // context for sentiment analysis
        remove stop words using custom stop words corpus // lemmatization - look at morphological analysis of the word
        // Example
        // dial      -> dial
        // dials     -> dial
        // dialing   -> dial
        // dialed    -> dial
        Extract lemma // Unsupervised machine learning
        classification_output = run unsupervised naive Bayes // Convert classification out to 0-100 sentiment score
        // Negative: 0-73
        // Neutral:  0-94
        // Positive: 0-100
        sentiment_score = calculate sentiment score from classification output // Get health score (0-100) for user's storage array system
        health_score = get storage array health score // Calculate user retention score (0-100)
        user_retention_score = 0.70 (sentiment_score) + 0.30 (health score)
```

FIG. 3

DETERMINING USER RETENTION VALUES USING MACHINE LEARNING AND HEURISTIC TECHNIQUES

FIELD

The field relates generally to information processing systems, and more particularly to techniques for processing interaction data in such systems.

BACKGROUND

Storage users of enterprises and other organizations can address problems and/or issues differently. Different users, based on their respective reactions to such problems and/or issues, as well as their respective reactions to how the problems and/or issues are handled by the enterprise, may take a variety of actions, leading to the possibility of user defection from the enterprise. Assessing and/or forecasting such user reactions via conventional user retention approaches, however, presents analysis and accuracy challenges.

SUMMARY

Illustrative embodiments of the disclosure provide techniques for determining user retention values using machine learning and heuristic techniques. An exemplary computer-implemented method includes processing multiple forms of input data pertaining to one or more interactions between a user and an enterprise, and generating one or more user sentiment values from the processed input data by applying one or more machine learning techniques to the processed input data. Such a method also includes determining a user-specific estimate for the enterprise retaining the user as a user of at least a portion of the enterprise, wherein determining the user-specific estimate comprises combining the one or more sentiment values with one or more storage system heuristics-based values derived from enterprise-related data. Further, such a method includes outputting the user-specific estimate to at least one entity within the enterprise for use in connection with one or more user-support actions.

Illustrative embodiments can provide significant advantages relative to conventional user retention techniques. For example, challenges associated with uncertainty arising from variable levels of user satisfaction in light of multiple storage system situations are overcome through the determination of user retention estimates. In some embodiments, this is achieved via application of natural language processing (NLP) algorithms and heuristics to enterprise telemetry data and storage system information.

These and other illustrative embodiments described herein include, without limitation, methods, apparatus, systems, and computer program products comprising processor-readable storage media.

BRIEF DESCRIPTION OF THE DRAWINGS

FIG. 3 shows example pseudocode for the implementation of NLP techniques in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
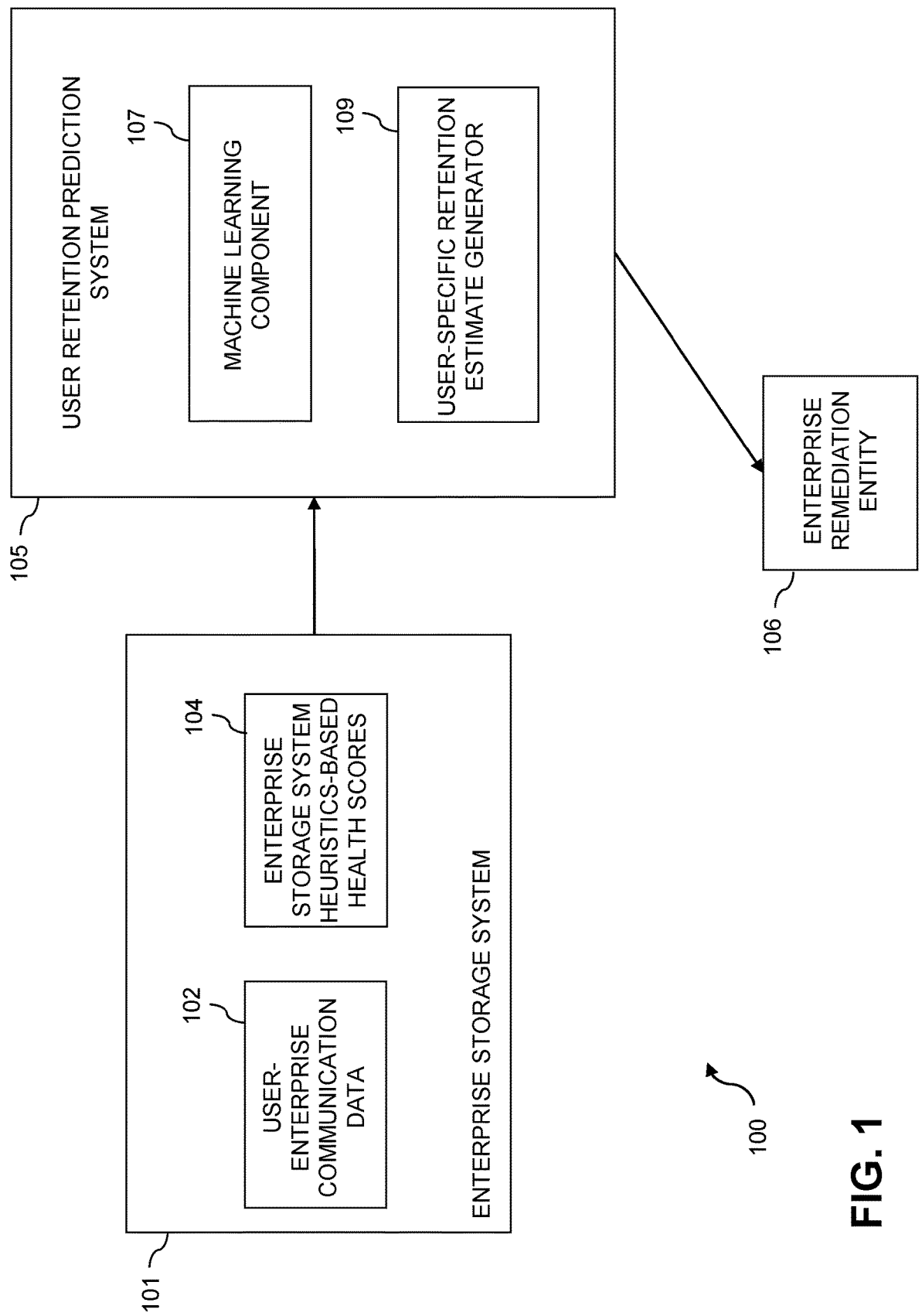
FIG. 1 shows an information processing system configured for determining user retention values using machine learning and heuristic techniques in an illustrative embodiment.

FIG. 1 shows a computer network (also referred to herein as an information processing system) 100 configured in accordance with an illustrative embodiment. The computer network 100 comprises an enterprise storage system 101, which includes user-enterprise communication data 102 and enterprise storage system heuristics-based health scores 104. Additionally, the computer network 100 also comprises a user retention prediction system 105, which includes a machine learning component 107 and a user-specific retention estimate generator 109. In at least one embodiment, the enterprise storage system 101 is coupled to the user retention prediction system 105 via a network, wherein the network in such an embodiment is assumed to represent a sub-network or other related portion of the larger computer network 100. As also depicted in FIG. 1, the computer network 100 comprises at least one enterprise remediation entity 106, which can be coupled to the user retention prediction system 105 as well.

It is to be appreciated that the term "user" in this context and elsewhere herein is intended to be broadly construed so as to encompass, for example, human, hardware, software or firmware entities, as well as various combinations of such entities. For example, a user may comprise, for example, mobile telephones, laptop computers, tablet computers, desktop computers or other types of computing devices. Such users in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Such a network is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, in one or more embodiments, each user retention prediction system 105 is assumed to be implemented using at least one processing device. Each such processing device generally comprises at least one processor and an associated memory, and implements one or more functional modules for controlling certain features of the user retention prediction system 105.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

It is to be appreciated that the particular arrangement of the machine learning component 107 and the user-specific retention estimate generator 109 illustrated in the user retention prediction system 105 of the FIG. 1 embodiment is presented by way of example only, and alternative arrangements can be used in other embodiments. For example, the functionality associated with the modules 107 and 109 in other embodiments can be combined into a single module, or separated across a larger number of modules. As another example, multiple distinct processors can be used to implement different ones of the modules 107 and 109 or portions thereof.

It is to be understood that the particular set of elements shown in FIG. 1 for determining user retention values using machine learning and heuristic techniques involving enterprise storage system 101 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing the machine learning component 107 and the user-specific retention estimate generator 109 of example user retention prediction system 105 in computer network 100 will be described in more detail with reference to the flow diagram of FIG. 5.

Accordingly, at least one embodiment of the invention includes determining user retention values using machine learning and heuristic techniques. Such an embodiment includes combining a subjective sentiment score and an objective valuation of a given storage system.

Figure 2:
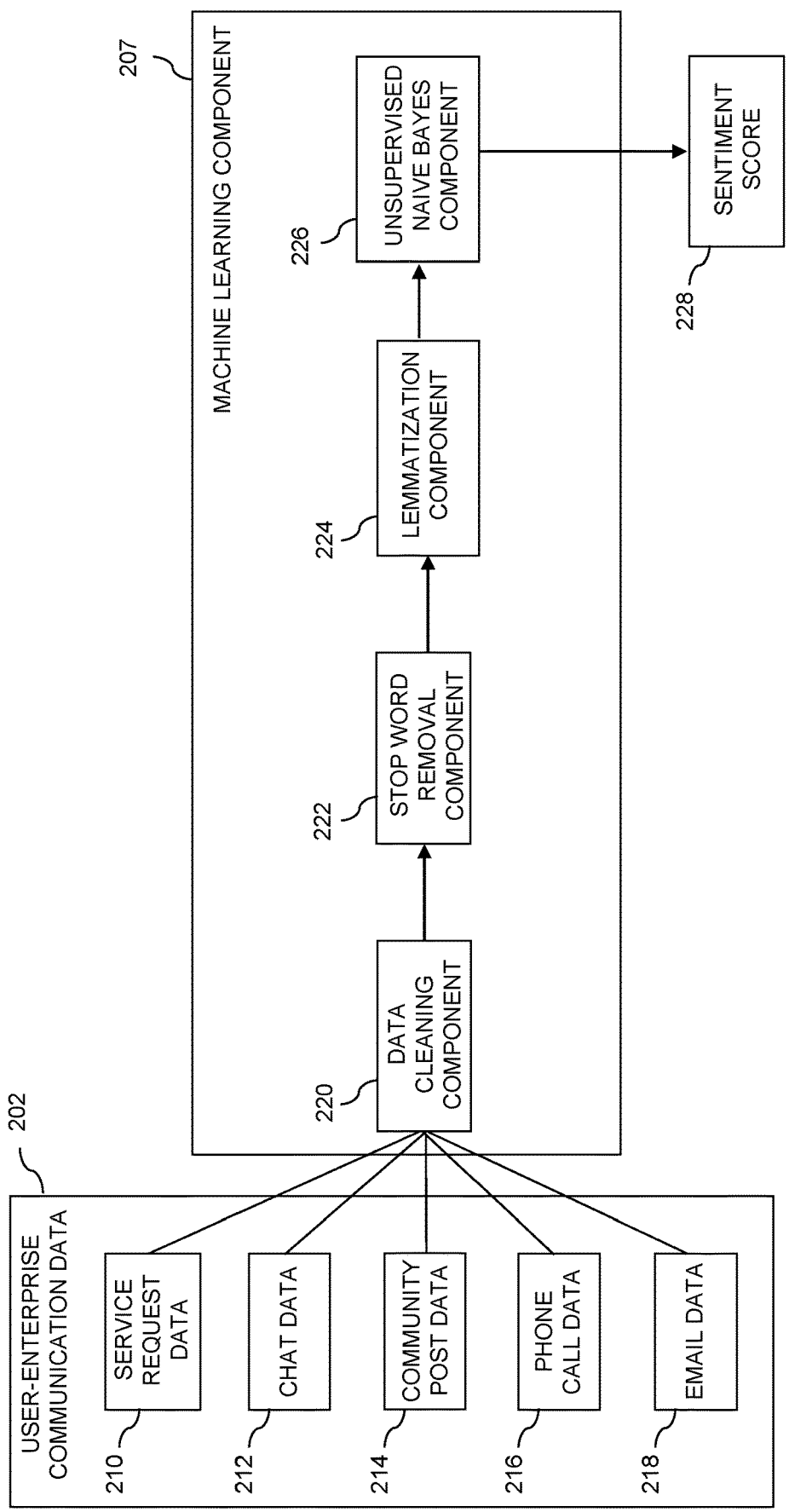
FIG. 2 shows implementation of machine learning techniques in an illustrative embodiment.

FIG. 2 shows implementation of machine learning techniques in an illustrative embodiment. By way of illustration, FIG. 2 depicts computer network 200, which includes user-enterprise communication data 202 and machine learning component 207. The user-enterprise communication data 202 include service request data 210 (which can include user-provided titles of user service requests, user-provided descriptions for user service requests, etc.), chat data 212 (e.g., text for chat conversion), community post data 214, phone call data 216 (e.g., transcripts), and email data 218 (e.g., transcripts from email communication between a user and an enterprise in connection with one or more storage systems). As depicted in FIG. 2, such data are provided to machine learning component 207 for processing.

Such processing by the machine learning component 207 includes NLP feature engineering techniques performed by data cleaning component 220, stop word removal component 222, and a lemmatization component 224, each of which would be applied to the provided user-enterprise communication data. Additionally, an NLP-based unsupervised naive Bayes component 226 is utilized within machine learning component 207 to extract sentiment (from the processed user-enterprise communication data) to determine one or more tones associated with words in the communication data, whereby such determined tones are subsequently used to gain understanding of the attitudes, opinions and/or emotions of the user and generate a sentiment score 228 for the user. By way merely of example, for sentiment scores generated within a range of 0-100, a score within the sub-range of 0-73 represents a negative tone, a score within the sub-range of 74-94 represents a neutral tone, and a score within the sub-range of 95-100 represents a positive tone.

Additionally, as further detailed herein (such as in FIG. 3, for example), one or more embodiments include combining such a subjective sentiment score with an objective storage system heuristics-based health score. In at least one embodiment, such a heuristics-based score is calculated based at least in part on the components, configuration, capacity, performance and data protection information associated with the given storage system. By way merely of illustration, in an example embodiment wherein the heuristics-based score ranges from 0-100, a score within the sub-range of 0-73 represents a poor score, a score within the sub-range of 74-94 represents a fair score, and a score within the sub-range of 95-100 represents a good score.

Also, in one or more embodiments a user retention score is calculated based on a weighted combination of the sentiment score and the heuristics-based score(s). By way merely of example, such an example includes combining a 70% weight of the sentiment score and a 30% weight of the average health score for all relevant storage systems. Further, in at least one embodiment, a user retention score within a given range (for example, between 0-73) triggers one or more automated user-support actions (e.g., to be performed in associated with an enterprise remediation entity). Such user-support actions can include, for example, migration actions (for instance, from a first set of one or more data structures within the enterprise to a second set of one or more data structures within the enterprise) related to improving user retention.

Additionally, in one or more embodiments, such user-support actions can vary across higher retention scores versus lower retention scores. For example, user-support actions suggested and/or performed in connection with higher retention scores can include proposing cross-selling and/or up-selling opportunities, setting-up and/or proposing a support contract auto-renewal, identifying the user in question as a candidate beta user for one or more new products, etc. Also, user-support actions suggested and/or performed in connection with lower retention scores can include, for example, assigning a dedicated user care representative for one or more subsequent user-enterprise interactions, offering a discount to retain the user, and sharing self-troubleshooting and/or help-related documents, videos, links, etc.

FIG. 3 shows example pseudocode for the implementation of NLP techniques in an illustrative embodiment. In this embodiment, pseudocode 300 is executed by or under the control of a processing system, such as user retention prediction system 105, or another type of processing system. For example, the pseudocode 300 may be viewed as comprising a portion of a software implementation of at least parts of machine learning component 107 and user-specific retention estimate generator 109 of the FIG. 1 embodiment.

The pseudocode 300 illustrates application of machine learning techniques (e.g., NLP techniques) to input data that include one or more transcripts of user-enterprise interactions, resulting in the generation of a user retention score (such as also detailed, for example, above in connection with FIG. 2).

It is to be appreciated that this particular pseudocode shows just one example implementation of a process for user retention estimation, and alternative implementations of the process can be used in other embodiments.

Figure 4:
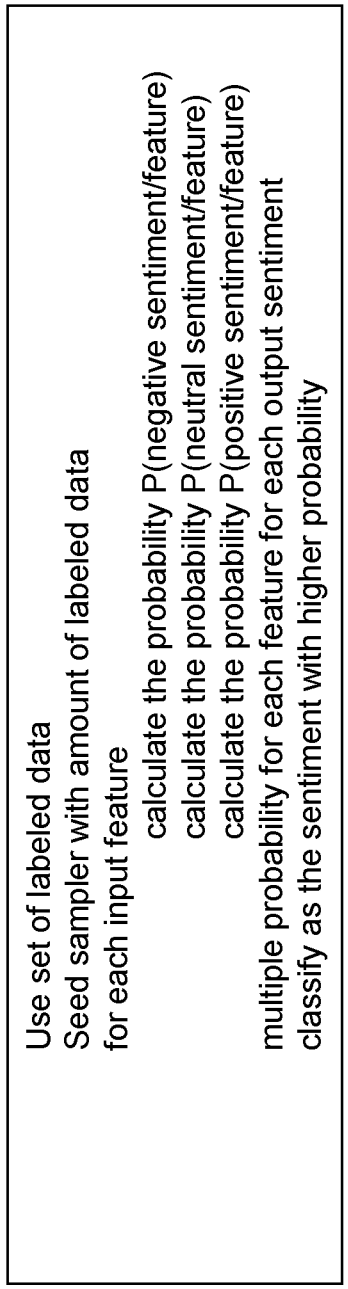
FIG. 4 shows example pseudocode for the implementation of unsupervised naive Bayes techniques in an illustrative embodiment.

FIG. 4 shows example pseudocode for the implementation of unsupervised naive Bayes techniques in an illustrative embodiment. In this embodiment, pseudocode 400 is executed by or under the control of a processing system, such as user retention prediction system 105, or another type of processing system. For example, the pseudocode 400 may be viewed as comprising a portion of a software implementation of at least parts of machine learning component 107 and user-specific retention estimate generator 109 of the FIG. 1 embodiment.

The pseudocode 400 illustrates application of machine learning techniques (e.g., unsupervised naive Bayes techniques) to input data that include pre-processed words (also referred to herein as features) and a set of labeled data, resulting in the classification (e.g., negative, neutral, or positive) of a user retention score (such as also detailed, for example, above in connection with FIG. 2).

Figure 5:
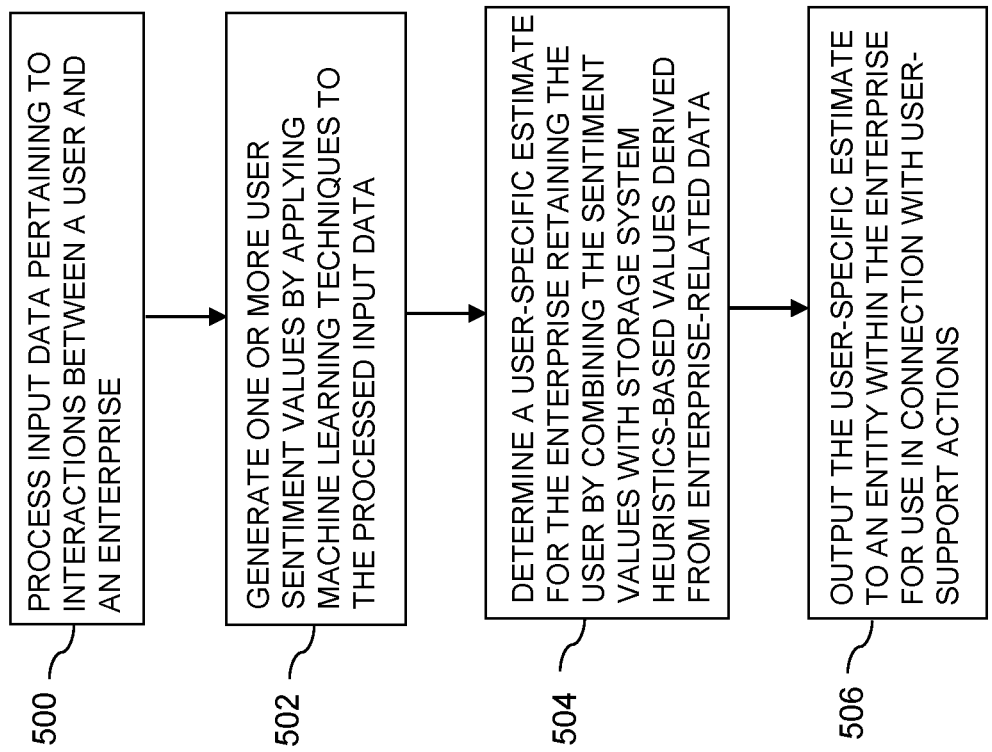
FIG. 5 is a flow diagram of a process for determining user retention values using machine learning and heuristic techniques in an illustrative embodiment.

FIG. 5 is a flow diagram of a process for determining user retention values using machine learning and heuristic techniques in an illustrative embodiment. It is to be understood that this particular process is only an example, and additional or alternative processes can be carried out in other embodiments.

In this embodiment, the process includes steps 500 through 506. These steps can be performed, for example, by user retention prediction system 105 utilizing its modules 107 and 109.

Step 500 includes processing multiple forms of input data pertaining to one or more interactions between a user and an enterprise. The input data can include data pertaining to one or more interactions between the user and the enterprise encompassing a given temporal period. For example, in at least one embodiment, the input data include one or more of user-provided titles of user service requests to the enterprise, user-provided descriptions of user service requests to the enterprise, text from one or more chat functions within at least one system of the enterprise, one or more enterprise community posts generated by the user, one or more phone call transcripts between the user and at least one entity within the enterprise, and/or email communication between the user and at least one entity within the enterprise.

Step 502 includes generating one or more user sentiment values from the processed input data by applying one or more machine learning techniques to the processed input data. The one or more machine learning techniques can include one or more natural language processing techniques. Additionally, in at least one embodiment, the one or more natural language processing techniques include one or more text cleaning actions, removal of one or more stop words, and one or more lemmatization techniques. Also, the one or more machine learning techniques can include one or more unsupervised naive Bayes classification techniques.

Further, in at least one embodiment, the one or more user sentiment values include at least one value representative of a negative user tone associated with the processed input data, at least one value representative of a neutral user tone associated with the processed input data, and at least one value representative of a positive user tone associated with the processed input data.

Step 504 includes determining a user-specific estimate for the enterprise retaining the user as a user of at least a portion of the enterprise, wherein determining the user-specific estimate comprises combining the one or more sentiment values with one or more storage system heuristics-based values derived from enterprise-related data. Combining the one or more sentiment values with the one or more storage system heuristics-based values derived from enterprise-related data can include weighting the one or more sentiment values and the one or more storage system heuristics-based values. Also, in at least one embodiment, the enterprise-related data can include storage system log information, storage system component information, storage system configuration information, storage system capacity-related information, storage system performance-related information, and/or information pertaining to one or more data protection categories.

Step 506 includes outputting the user-specific estimate to at least one entity within the enterprise for use in connection with one or more user-support actions. In one or more embodiments such an outputting step (i.e., step 506) is optional.

Additionally, at least one embodiment includes automatically updating, in response to the user-specific estimate, at least one data structure associated with the user. Further, at least one embodiment includes automatically executing, in response to the user-specific estimate, at least one of the one or more user-support actions in connection with at least one system within the enterprise.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine user retention estimates. These and other embodiments apply machine learning techniques and heuristics to user-enterprise interaction data and storage system information in order to improve user retention and enterprise efficiency.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
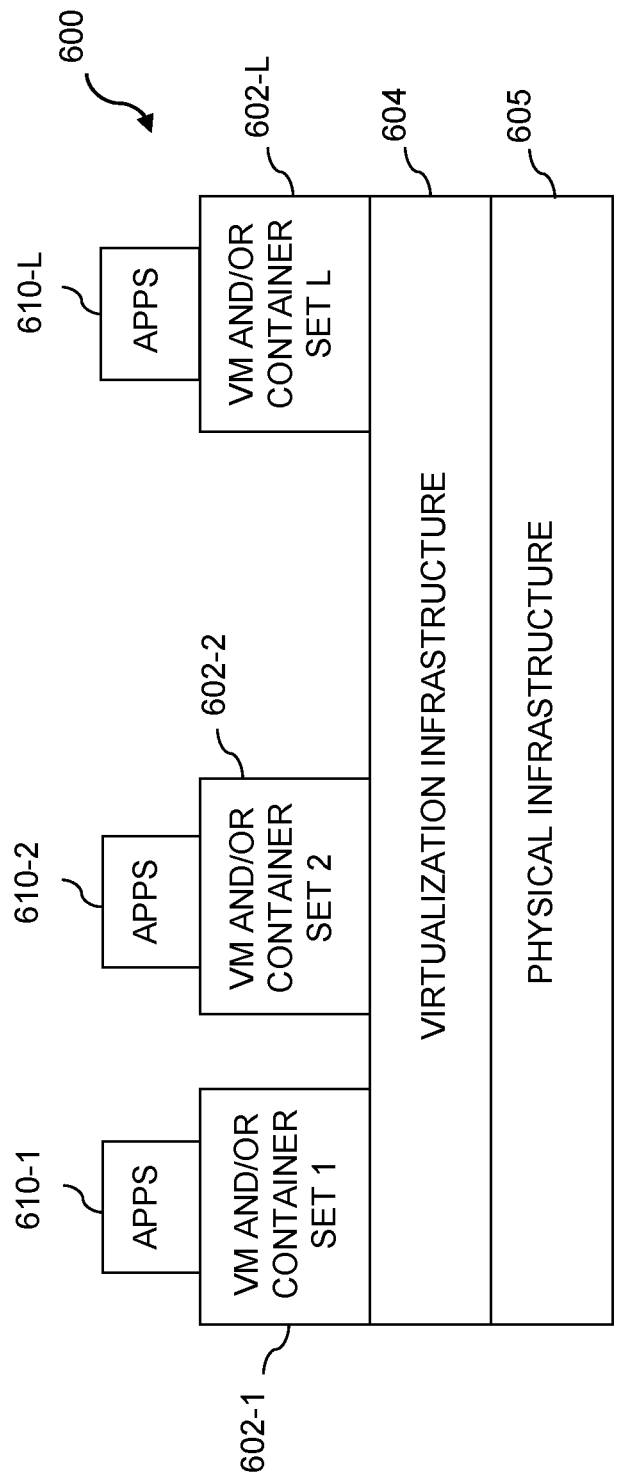
FIGS. 6 and 7 show examples of processing platforms that may be utilized to implement at least a portion of an information processing system in illustrative embodiments.
Figure 7:
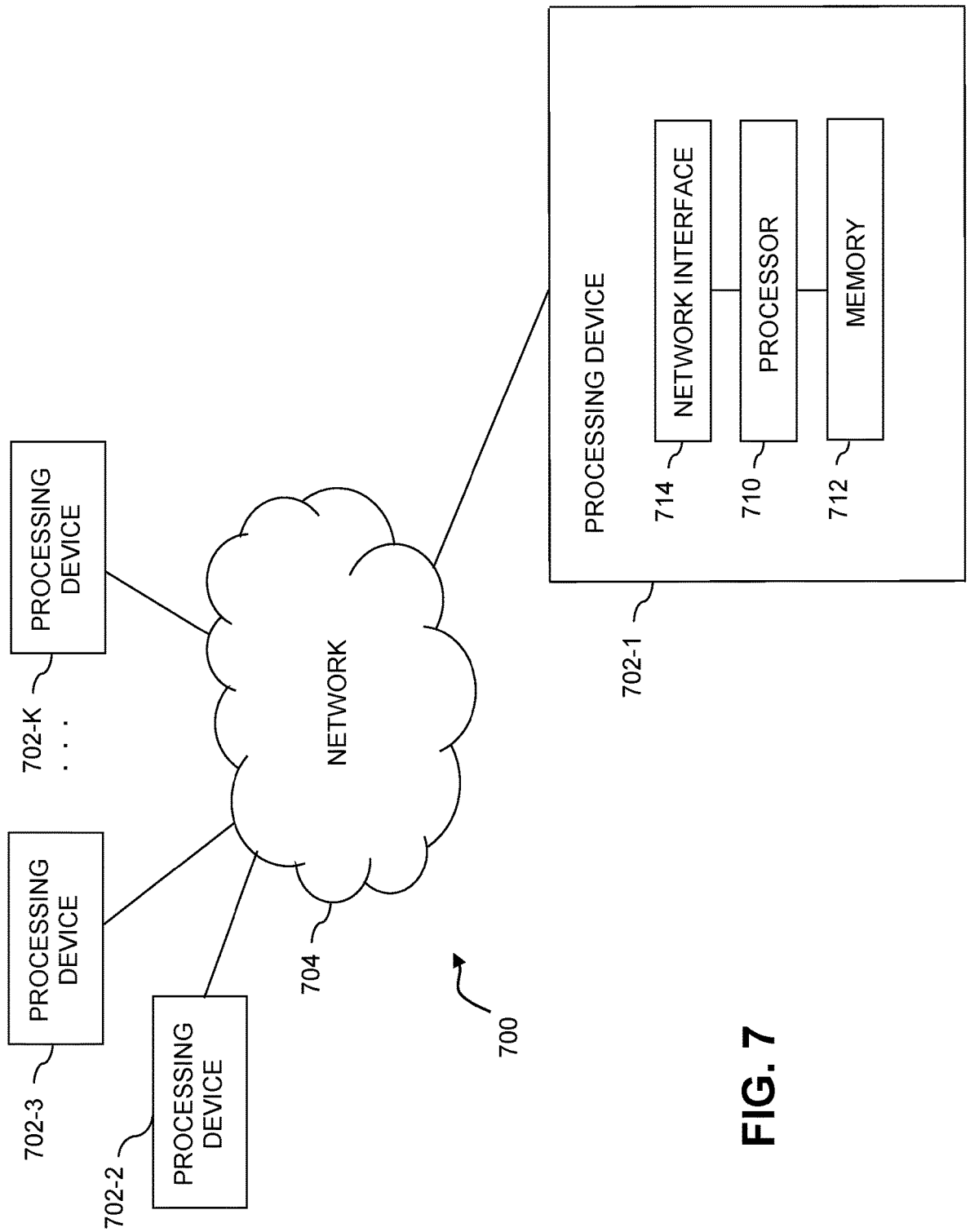

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

An example of a hypervisor platform used to implement a hypervisor within the virtualization infrastructure 604 is the VMware® vSphere® which has an associated virtual infrastructure management system such as the VMware® vCenter™. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   processing multiple forms of input data pertaining to one or more interactions between a user and an enterprise using natural language processing techniques comprising (i) performing one or more text cleaning actions, (ii) removing one or more stop words, and (iii) performing one or more lemmatization techniques;
   generating multiple user sentiment values from the processed input data by processing at least a portion of the processed input data using one or more unsupervised naïve Bayes classification techniques comprising (i) processing multiple features identified within the at least a portion of the processed input data and a set of labeled data, (ii) calculating, for each of the multiple features, a negative sentiment probability, a neutral sentiment probability, and a positive sentiment probability, and (iii) classifying each of the multiple features based at least in part on the corresponding calculated negative sentiment probability, the corresponding calculated neutral sentiment probability, and the corresponding calculated positive sentiment probability;
   automatically training at least a portion of the one or more unsupervised naïve Bayes classification techniques based at least in part on the classifying of each of the multiple features, wherein said automatically training the at least a portion of the one or more unsupervised naïve Bayes classification techniques comprise automatically updating the set of labeled data using at least a portion of the classifying of each of the multiple features;
   determining a user-specific estimate for the enterprise retaining the user as a user of at least a portion of the enterprise, wherein determining the user-specific estimate comprises combining the multiple user sentiment values with storage system heuristics-based values derived from storage system log information, storage system component information, storage system configuration information, storage system capacity-related information, storage system performance-related information, and information pertaining to one or more data protection categories; and
   outputting the user-specific estimate to at least one entity within the enterprise for use in connection with one or more user-support actions;
   wherein the method is performed by at least one processing device comprising a processor coupled to a memory.

2. The computer-implemented method of claim 1, further comprising:
   automatically updating, in response to the user-specific estimate, at least one data structure associated with the user.

3. The computer-implemented method of claim 1, further comprising:
   automatically executing, in response to the user-specific estimate, at least one of the one or more user-support actions in connection with at least one system within the enterprise.

4. The computer-implemented method of claim 1, wherein combining the multiple user sentiment values with the storage system heuristics-based values derived from enterprise-related data comprises weighting the multiple user sentiment values and the storage system heuristics-based values.

5. The computer-implemented method of claim 1, wherein the input data comprise data pertaining to one or more interactions between the user and the enterprise encompassing a given temporal period.

6. The computer-implemented method of claim 1, wherein the input data comprise one or more of user-provided titles of user service requests to the enterprise, user-provided descriptions of user service requests to the enterprise, text from one or more chat functions within at least one system of the enterprise, one or more enterprise community posts generated by the user, one or more phone call transcripts between the user and at least one entity within the enterprise, and email communication between the user and at least one entity within the enterprise.

7. A non-transitory processor-readable storage medium having stored therein program code of one or more software programs, wherein the program code when executed by at least one processing device causes the at least one processing device:

to process multiple forms of input data pertaining to one or more interactions between a user and an enterprise using natural language processing techniques comprising (i) performing one or more text cleaning actions, (ii) removing one or more stop words, and (iii) performing one or more lemmatization techniques;

to generate multiple user sentiment values from the processed input data by processing at least a portion of the processed input data using one or more unsupervised naïve Bayes classification techniques comprising (i) processing multiple features identified within the at least a portion of the processed input data and a set of labeled data, (ii) calculating, for each of the multiple features, a negative sentiment probability, a neutral sentiment probability, and a positive sentiment probability, and (iii) classifying each of the multiple features based at least in part on the corresponding calculated negative sentiment probability, the corresponding calculated neutral sentiment probability, and the corresponding calculated positive sentiment probability;

to automatically train at least a portion of the one or more unsupervised naïve Bayes classification techniques based at least in part on the classifying of each of the multiple features, wherein said automatically training the at least a portion of the one or more unsupervised naïve Bayes classification techniques comprise automatically updating the set of labeled data using at least a portion of the classifying of each of the multiple features;

to determine a user-specific estimate for the enterprise retaining the user as a user of at least a portion of the enterprise, wherein determining the user-specific estimate comprises combining the multiple user sentiment values with storage system heuristics-based values derived from storage system log information, storage system component information, storage system configuration information, storage system capacity-related information, storage system performance-related information, and information pertaining to one or more data protection categories; and to output the user-specific estimate to at least one entity within the enterprise for use in connection with one or more user-support actions.

8. The non-transitory processor-readable storage medium of claim 7, wherein the program code further causes the at least one processing device to:

automatically update, in response to the user-specific estimate, at least one data structure associated with the user.

9. The non-transitory processor-readable storage medium of claim 7, wherein the program code further causes the at least one processing device to:

automatically execute, in response to the user-specific estimate, at least one of the one or more user-support actions in connection with at least one system within the enterprise.

10. The non-transitory processor-readable storage medium of claim 7, wherein combining the multiple user sentiment values with the one or more storage system heuristics-based values derived from enterprise-related data comprises weighting the multiple user sentiment values and the one or more storage system heuristics-based values.

11. The non-transitory processor-readable storage medium of claim 7, wherein the input data comprise data pertaining to one or more interactions between the user and the enterprise encompassing a given temporal period.

12. The non-transitory processor-readable storage medium of claim 7, wherein the input data comprise one or more of user-provided titles of user service requests to the enterprise, user-provided descriptions of user service requests to the enterprise, text from one or more chat functions within at least one system of the enterprise, and one or more enterprise community posts generated by the user.

13. The non-transitory processor-readable storage medium of claim 7, wherein the input data comprise one or more of one or more phone call transcripts between the user and at least one entity within the enterprise, and email communication between the user and at least one entity within the enterprise.

14. An apparatus comprising:

at least one processing device comprising a processor coupled to a memory;

the at least one processing device being configured:

to process multiple forms of input data pertaining to one or more interactions between a user and an enterprise using natural language processing techniques comprising (i) performing one or more text cleaning actions, (ii) removing one or more stop words, and (iii) performing one or more lemmatization techniques;

to generate multiple user sentiment values from the processed input data by processing at least a portion of the processed input data using one or more unsupervised naïve Bayes classification techniques comprising (i) processing multiple features identified within the at least a portion of the processed input data and a set of labeled data, (ii) calculating, for each of the multiple features, a negative sentiment probability, a neutral sentiment probability, and a positive sentiment probability, and (iii) classifying each of the multiple features based at least in part on the corresponding calculated negative sentiment probability, the corresponding calculated neutral sentiment probability, and the corresponding calculated positive sentiment probability;

to automatically train at least a portion of the one or more unsupervised naïve Bayes classification techniques based at least in part on the classifying of each of the multiple features, wherein said automatically training the at least a portion of the one or more unsupervised naïve Bayes classification techniques comprise automatically updating the set of labeled data using at least a portion of the classifying of each of the multiple features;

to determine a user-specific estimate for the enterprise retaining the user as a user of at least a portion of the enterprise, wherein determining the user-specific estimate comprises combining the multiple user sentiment values with storage system heuristics-based values derived from storage system log information, storage system component information, storage system configuration information, storage system capacity-related information, storage system performance-related information, and information pertaining to one or more data protection categories; and to output the user-specific estimate to at least one entity within the enterprise for use in connection with one or more user-support actions.

15. The apparatus of claim 14, wherein the at least one processing device is further configured to:

automatically execute, in response to the user-specific estimate, at least one of the one or more user-support actions in connection with at least one system within the enterprise.

16. The apparatus of claim 14, wherein the at least one processing device is further configured to:

automatically update, in response to the user-specific estimate, at least one data structure associated with the user.

17. The apparatus of claim 14, wherein combining the multiple user sentiment values with the one or more storage system heuristics-based values derived from enterprise-related data comprises weighting the multiple user sentiment values and the one or more storage system heuristics-based values.

18. The apparatus of claim 14, wherein the input data comprise data pertaining to one or more interactions between the user and the enterprise encompassing a given temporal period.

19. The apparatus of claim 14, wherein the input data comprise one or more of user-provided titles of user service requests to the enterprise, user-provided descriptions of user service requests to the enterprise, text from one or more chat functions within at least one system of the enterprise, and one or more enterprise community posts generated by the user.

20. The apparatus of claim 14, wherein the input data comprise one or more of one or more phone call transcripts between the user and at least one entity within the enterprise, and email communication between the user and at least one entity within the enterprise.

* * * * *